United States Patent [19]
Orlando

[11] Patent Number: 5,836,551
[45] Date of Patent: Nov. 17, 1998

[54] BOTTOM PIVOT WALLMOUNT BRACKET AND WIRE MANAGEMENT SYSTEM

[75] Inventor: Stephen Orlando, Longboat Key, Fla.

[73] Assignee: Ortronics Corporation, Pawcatuck, Conn.

[21] Appl. No.: 686,750

[22] Filed: Jul. 26, 1996

[51] Int. Cl.[6] .................................................... F16L 3/00
[52] U.S. Cl. ............................ 248/49; 361/823; 439/713
[58] Field of Search .................................. 248/49, 56, 65, 248/68.1, 27.1, 27.3, 291.1, 544, 674, 675, 201, 906; 174/48, 49, 65, 66, 67; 439/713, 922; 312/242

[56] References Cited

U.S. PATENT DOCUMENTS

| | | | |
|---|---|---|---|
| 4,381,063 | 4/1983 | Leong .......................................... | 174/67 |
| 4,721,476 | 1/1988 | Zeliff et al. ................................ | 174/48 |
| 4,766,521 | 8/1988 | Pelletier ..................................... | 361/426 |
| 4,881,295 | 11/1989 | Odemer ..................................... | 248/27.1 |
| 5,082,336 | 1/1992 | Munch et al. ............................ | 312/242 |
| 5,401,193 | 3/1995 | Lo Cicero et al. ...................... | 439/713 |

*Primary Examiner*—Ramon O. Ramirez
*Assistant Examiner*—Anita M. King
*Attorney, Agent, or Firm*—Pepe & Hazard LLP

[57] ABSTRACT

A stand-off wire management bracket and system having a back panel, side walls extending from the back panel and attachment brackets pivotally connected to the side walls for pivotal attachment of one or more wire panels. The wire panel is connected across the attachment brackets which rotate about a common axis substantially parallel to the back panel, providing access to the rear portion of the wire panel without requiring disconnection of all connecting points, and without requiring excess clearance, or excess slack in cables. The side panels also include stops to limit the rotation of the attachment brackets and any wire panel attached thereto.

2 Claims, 1 Drawing Sheet

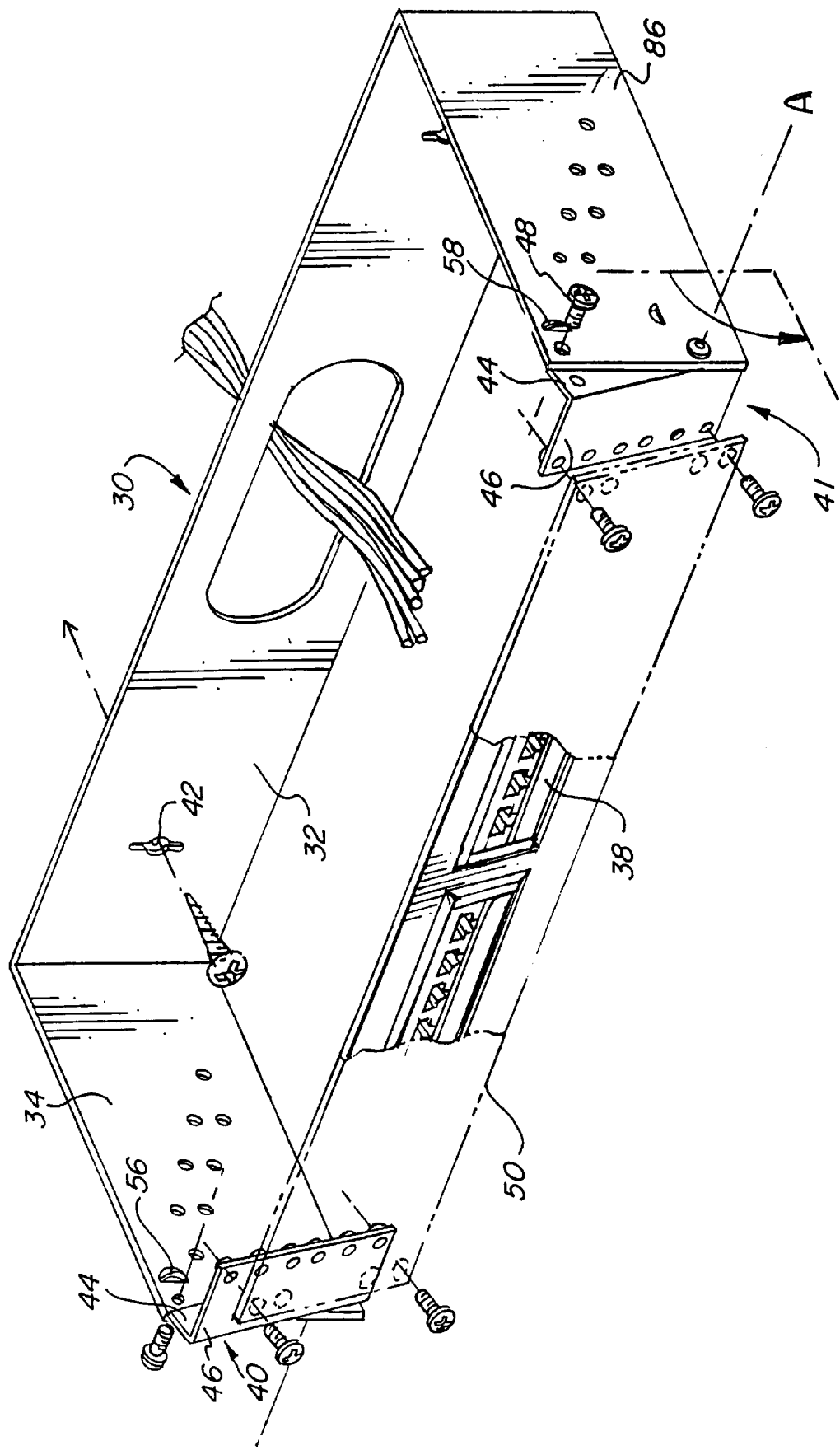

BOTTOM PIVOT WALLMOUNT BRACKET AND WIRE MANAGEMENT SYSTEM

TECHNICAL FIELD

This invention relates to wire management systems and specifically to wall-mountable stand-off brackets.

BACKGROUND ART

Modern buildings, particularly commercial buildings, require an effective and efficient telecommunications infrastructure to support the wide variety of services that rely on the electronic transport of information.

Typically, wiring systems within buildings are terminated in a central wiring closet where they may be interconnected with one another, and/or to other cabling systems or telecommunications equipment. Cables are often terminated on wire panels (such as RJ-45 patch panels) or the like which are mounted either to racks, or to stand-off brackets affixed to a wall.

Stand-off brackets typically consist of metal forms with a back panel (which may be affixed to a wall or a rack) and side walls extending from the back panel. The back panel may include a hole through which wires are lead for connection to a wire panel attached across the side walls.

Some stand-off brackets are rigid structures and the wiring panel, such as a patch panel, is rigidly mounted to the side walls. In order to access the rear of the wire panel, the wire panel must be completely disconnected (i.e. unbolted) from the stand-off bracket. While this is an effective means to gain access to the rear of the wire panel, because all the connection points must be disconnected, and because once all connection points are disconnected the panel may be difficult to control, it is difficult to work on panels attached to stand-off brackets of this type.

Other stand-off bracket designs provide for panels to be hingedly connected to one of the side walls so that the wire panel may be rotated outward, in a horizontal plane. This eliminates the need to disconnect all connection points, thereby reducing disconnection time and effort, while providing stability to the panel while it is being worked on.

However, because the panel is pivoted on one of the sides, the panel must necessarily rotate in a horizontal plane through a relatively wide arc. This can be undesirable for two reasons: First, wire management panels typically measure 19" from side to side, thus there must be at least 19" of clearance between the panel and the nearest structure. Second, the wide arc may necessitate that additional slack be left in cables connected to the wire panel, especially in the cables terminated or attached to the free end of the wire panel. It is one of the goals of wire management systems to organize cabling systems therefore, such slack is undesirable. The problem of excess cable can be avoided if the wire panel includes a wire management system that leads all cables toward the hinge, however this usually requires additional structure and possibly an increase in the size of the wire panel.

Therefore, it would be desirable to have a stand-off bracket to which wire panel can be mounted in a manner which allows access to the rear portion thereof without the need to disconnect all connection points and without the need to provide for excess slack in the connected cables.

DISCLOSURE OF THE INVENTION

Accordingly, it is an object of the invention to provide a stand-off bracket to which any standard wire panels can be mounted in a manner which allows access to the rear portion thereof.

It is another object of the invention to provide a bracket of the above character which does not require the disconnection of all connecting points.

It is still another object of the invention to provide a bracket of the above character which does not require that excess slack be left in the connected cables.

It is yet another object of the invention to provide a bracket of the above character which does not require excess clearance to gain access to the rear portion of the wire panels.

It is a further object of the invention to provide a bracket of the above character to which wire panels may be pivotally attached so as to pivot about a horizontal axis.

It is still a further object of the invention to provide a bracket of the above character having two attachment brackets each pivotally attached to the bracket for pivotally supporting a wire panel.

These and other objects are achieved by the present invention which provides a stand-off bracket having a back panel, side panels extending from the back panel, and attachment brackets pivotally connected to the side panels for pivotal attachment of one or more wire panels. The attachment brackets rotate about an axis which is substantially parallel to a longitudinal axis of the back panel (and the wire panel) thereby providing access to the rear portion of the wire panel without requiring disconnection of all connecting points, and without requiring excess slack in connected cables or excess clearance. The side panels also include stops to limit the rotation of the attachment brackets.

BRIEF EXPLANATION OF THE FIGURE

The FIGURE is an isometric drawing of a stand-off bracket with a vertically-hinged wire panel showing the relatively wide arc of rotation.

BEST MODES FOR CARRYING OUT THE INVENTION

Referring to the FIGURE, bracket 30 of the present invention includes a back panel 32, side panels 34, 36 extending from back panel 32, and attachment brackets 40, 41 pivotally connected to side panels 34, 36. Back panel 32 may include mounting holes 42 for mounting to a wall or rack (not shown). Attachment brackets 40, 41 each include first and second sections 44, 46. First sections 44 of attachment brackets 40, 41 are pivotally attached (here by rivets) to the inside surfaces of side panels 34, 36 and share a common axis of rotation A which is substantially parallel to a longitudinal axis of back panel 32. As shown in the Figure, the attachment brackets 40,41 are pivotally attached at a front lower corner of each side panel 34,36. First sections 44 of attachment brackets 40, 41 may also be affixed to side panels 34, 36 by removable bolts 48 at a second point to lock attachment brackets 40, 41 in place. Other means to secure the attachment brackets 40, 41 such as screws, latches, or similar fasteners are also within the contemplation of the invention.

Any standard wire panel 50 (here shown in ghost lines), such an RJ-45 patch panel, may be connected across attachment brackets 40, 41 via bolts 52. Thus, if access to the rear 54 of wire panel 50 is desired, bolts 48 may be removed and the assembly of wire panel 50 and attachment brackets 40, 41 may be rotated about axis A to open attachment brackets 40, 41 and provide access to the rear portion 54 of wire panel 50.

It is an advantage of the invention that when axis A passes through first sections 44 near their lower edges (as in the preferred embodiment), the attached panel can swing out to permit access from the top thereby providing direct and convenient access.

In the Figure, the attachment brackets 40, 41 are shown in an intermediate position. In a closed position, second sections 46 of attachment brackets 40, 41 are substantially parallel back panel 32 (i.e. nearly vertical.) In an open position, second sections 46 are substantially perpendicular to back panel 32 (i.e. nearly horizontal.)

Side panels 34, 36 may also include stops 56, 58 to limit the rotation of the attachment brackets 40, 41. Stops 56, 58 may be formed by punch-outs in side panels 34, 36 or may take some other form such as by punch-outs in side panels 34, 36 or may take some other form such as a bolt. Preferably, stops 56 are aligned such that when attachment brackets 40, 41 are fully opened, the second sections 46 are nearly horizontal (or nearly perpendicular to the back panel 32) so that the rear 54 of the wire panel 50 may be worked on easily. Also, preferably stops 58 are aligned such that, when attachment brackets 40, 41 are closed, the second sections 46 will not rotate much beyond vertical.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention as defined in the appended claims.

What is claimed is:

1. A stand-off wire management bracket comprising:

a back panel having a longitudinal axis;

two side panels extending from said back panel, said side panels each having inside surfaces and having an upper stop and a lower stop extending from said inside surfaces;

two attachment brackets, with each attachment bracket having a first section and a second section substantially perpendicular to said first section, said first sections being pivotally connected to said inside surfaces of said side panels at lower corners of the side panels furthest from the back panel such that said attachment brackets rotate about an axis substantially parallel said longitudinal axis of said back panel;

said attachment brackets having open and closed positions, portions of said second sections of said attachment brackets being substantially parallel said back panel when said attachment brackets are closed, and portions of said second sections of said attachment brackets being substantially perpendicular said back panel when said attachment brackets are fully open;

said upper stops being positioned to contact said first sections of said attachment brackets when said attachment brackets are closed, and said lower stops being positioned to contact said first sections of said attachment brackets when said attachment brackets are fully opened; and means to secure said attachment brackets to said side panels in said closed position, said securing means being removable.

2. A wire management system comprising:

a back panel having a longitudinal axis;

two side panels extending from said back panel, said side panels each having inside surfaces and having an upper stop and a lower stop extending from said inside surfaces;

two attachment brackets, with each attachment bracket having a first section and a second section substantially perpendicular to said first section, said first sections being pivotally connected to said inside surfaces of said side panels at lower corners of the side panels furthest from the back panel such that said attachment brackets rotate about an axis substantially parallel said longitudinal axis of said back panel;

said attachment brackets having open and closed positions, portions of said second sections of said attachment brackets being substantially parallel said back panel when said attachment brackets are closed, and portions of said second sections of said attachment brackets being substantially perpendicular said back panel when said attachment brackets are fully open;

said upper stops being positioned to contact said first sections of said attachment brackets when said attachment brackets are closed, and said lower stops being positioned to contact said first sections of said attachment brackets when said attachment brackets are fully opened;

means to secure said attachment brackets to said side panels in said closed position, said securing means being removable; and a wire panel connected across said second sections of said attachment brackets.

* * * * *